(12) United States Patent
Philpott et al.

(10) Patent No.: US 9,920,800 B2
(45) Date of Patent: Mar. 20, 2018

(54) BRAKE ASSEMBLY HAVING A BRIDGE

(71) Applicant: ArvinMeritor Technology, LLC, Troy, MI (US)

(72) Inventors: Daniel Philpott, Oxford, MI (US); Lebree Jones, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 23 days.

(21) Appl. No.: 14/860,101

(22) Filed: Sep. 21, 2015

(65) Prior Publication Data

US 2017/0082160 A1 Mar. 23, 2017

(51) Int. Cl.
*F16D 65/00* (2006.01)
*F16D 65/097* (2006.01)
*F16D 55/225* (2006.01)
*F16D 55/00* (2006.01)

(52) U.S. Cl.
CPC ..... *F16D 65/0075* (2013.01); *F16D 65/0978* (2013.01); *F16D 55/225* (2013.01); *F16D 2055/002* (2013.01); *F16D 2250/0023* (2013.01)

(58) Field of Classification Search
CPC ..... F16D 2055/0016; F16D 2055/0008; F16D 2065/1392; F16D 2065/785; F16D 65/0068; F16D 2055/0037; F16D 65/0081
USPC ...................................................... 188/73.1
See application file for complete search history.

(56) References Cited

U.S. PATENT DOCUMENTS

| | | | | |
|---|---|---|---|---|
| 5,727,659 A * | 3/1998 | Brown | ................ | F16D 55/2262 188/72.7 |
| 5,875,873 A * | 3/1999 | Kay | ..................... | F16D 55/224 188/73.37 |
| 6,302,243 B1 * | 10/2001 | Ruiz | .................... | F16D 55/228 188/73.1 |
| 6,478,121 B2 * | 11/2002 | Reeves | ............... | F16D 55/2265 188/258 |
| 7,815,022 B2 * | 10/2010 | Aydt | ...................... | F16D 55/00 188/71.1 |
| 8,028,810 B2 * | 10/2011 | Bach | ..................... | F16D 55/226 188/73.39 |
| 8,336,681 B2 * | 12/2012 | Renz | .................. | B22D 19/0009 188/73.1 |
| 8,485,323 B2 * | 7/2013 | Narayanan V | ........ | F16D 55/227 188/250 B |
| 8,857,575 B2 | 10/2014 | Philpott | | |
| 2005/0067232 A1 * | 3/2005 | Roberts | .................. | F16D 55/28 188/73.1 |

(Continued)

FOREIGN PATENT DOCUMENTS

DE 102014107227 A1 9/2015

OTHER PUBLICATIONS

Meritor, Maintenance Manual No. MM-0350, Meritor, Inc. Air Disc Brake Service Manual ELSA 195, 225 & 250, Issued: Sep. 2012.

(Continued)

*Primary Examiner* — Anna M Momper
*Assistant Examiner* — Mahbubur Rashid
(74) *Attorney, Agent, or Firm* — Brooks Kushman P.C.

(57) ABSTRACT

A brake assembly having a brake carrier, a housing, and a bridge. The brake carrier may support at least one brake pad assembly. The housing may be disposed on the brake carrier. The bridge may be fixedly disposed on the housing. The bridge may extend over the brake pad assembly.

20 Claims, 3 Drawing Sheets

(56) References Cited

U.S. PATENT DOCUMENTS

| | | | |
|---|---|---|---|
| 2006/0042890 A1* | 3/2006 | Samuelsson | F16D 55/00 188/73.1 |
| 2008/0110707 A1* | 5/2008 | Kromer | F16D 65/00 188/218 A |
| 2009/0236188 A1* | 9/2009 | Raffin | F16D 65/0974 188/73.31 |
| 2015/0184710 A1 | 7/2015 | Peschel et al. | |

OTHER PUBLICATIONS

European Patent Office, Extended European Search Report for the corresponding European Patent Application No. 16176730.6, dated Mar. 8, 2017.

* cited by examiner

BRAKE ASSEMBLY HAVING A BRIDGE

TECHNICAL FIELD

This patent application relates to a brake assembly having a bridge.

BACKGROUND

A brake caliper assembly having a pad shield is disclosed in U.S. Pat. No. 8,857,575.

SUMMARY

In at least one embodiment, a brake assembly is provided. The brake assembly may include a brake carrier, first and second brake pad assemblies, first and second brake pad springs, a housing, and a bridge. The brake carrier may support the first and second brake pad assemblies. The first and second brake pad springs may be disposed on the first and second brake pad assemblies, respectively. The housing may be disposed on the brake carrier. The housing may receive an actuator for actuating the first and second brake pad assemblies. The bridge may be fixedly disposed on the housing. The bridge may include a first side surface, a second side surface, an inner surface, and a support bracket. The first and second side surfaces may face toward the brake carrier and may be disposed opposite each other. The inner surface may extend from the first side surface to the second side surface and over the first and second brake pad assemblies. The first and second pads springs may engage the inner surface. The support bracket may extend from the inner surface and may engage the second brake pad assembly.

In at least one embodiment, a brake assembly is provided. The brake assembly may include a housing and a bridge. The housing may receive an actuator that may actuate a brake pad assembly. The bridge may be fixedly disposed on the housing. The bridge may include an abutment surface, an end surface, a first side surface, a second side surface, an inner surface, and a support bracket. The abutment surface may be disposed on the housing. The end surface may be disposed opposite the abutment surface. The first side surface may extend from the abutment surface to the end surface. The second side surface may extend from the abutment surface to the end surface and may be disposed opposite the first side surface. The inner surface may extend from the abutment surface to the end surface and from the first side surface to the second side surface. The support bracket may extend from the inner surface and may engage the brake pad assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
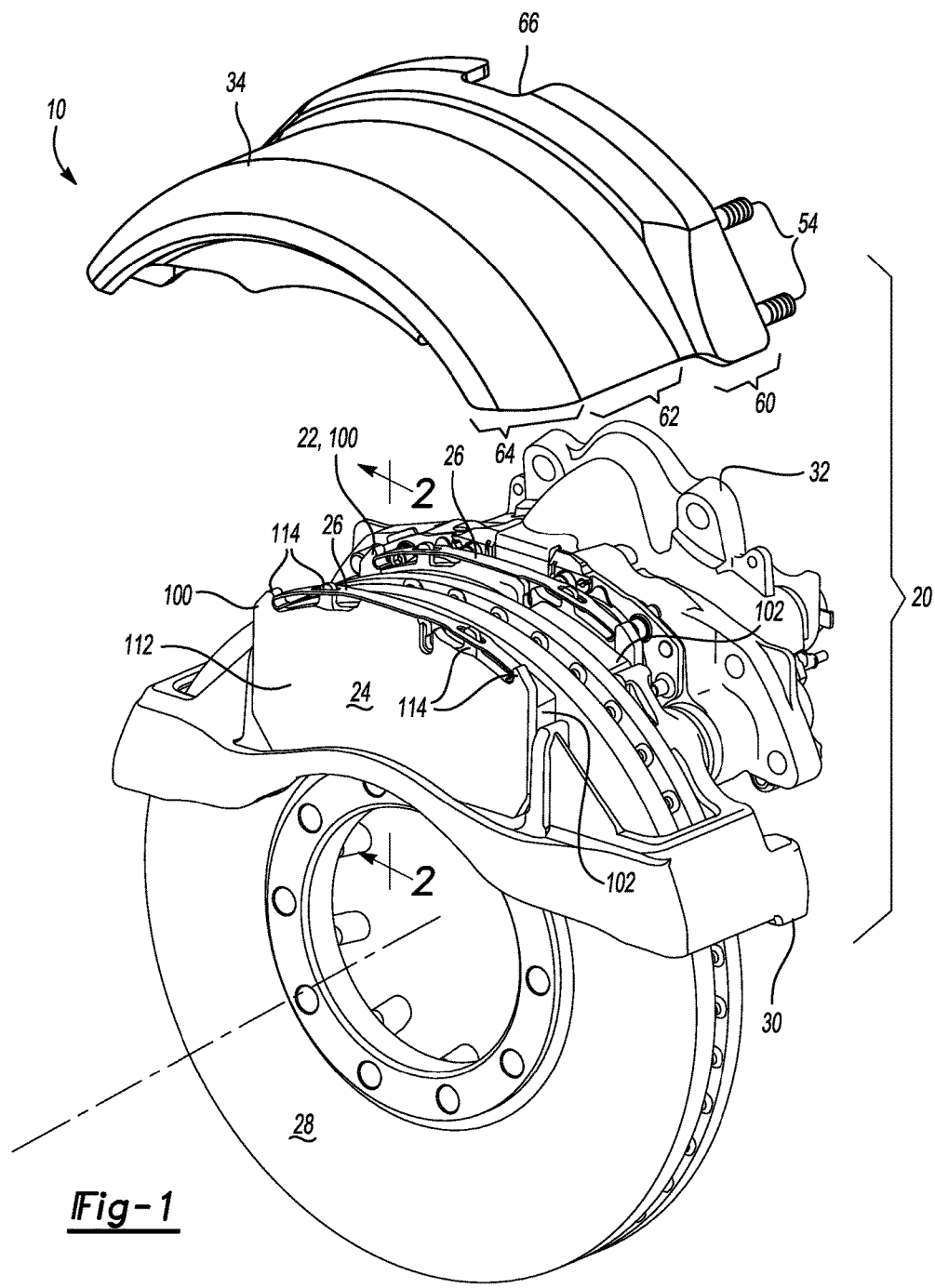
FIG. 1 is a partially exploded view of a brake assembly.

Referring to FIG. 1, a brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In at least one embodiment, the brake assembly 10 may include a housing assembly 20, a first brake pad assembly 22, a second brake pad assembly 24, and at least one brake pad spring 26.

The housing assembly 20 may receive various components of the brake assembly 10. In addition, the housing assembly 20 may facilitate positioning of the first brake pad assembly 22 and the second brake pad assembly 24 with respect to a rotor 28, also known as a brake disc, to facilitate braking of the vehicle. In at least one embodiment, the housing assembly 20 may include a brake carrier 30, a housing 32, and a bridge 34.

The brake carrier 30 may be fixedly mounted to the vehicle. For example, the brake carrier 30 may be connected to an axle assembly or a steering knuckle, such as with an intermediate component like a torque plate in one or more embodiments. The brake carrier 30 may receive and/or support the first brake pad assembly 22 and the second brake pad assembly 24 and may include a rotor opening that may be configured to receive the rotor 28. As such, the brake carrier 30 may straddle the rotor 28 and help position the first brake pad assembly 22 and the second brake pad assembly 24 on opposite sides of the rotor 28.

Figure 2:
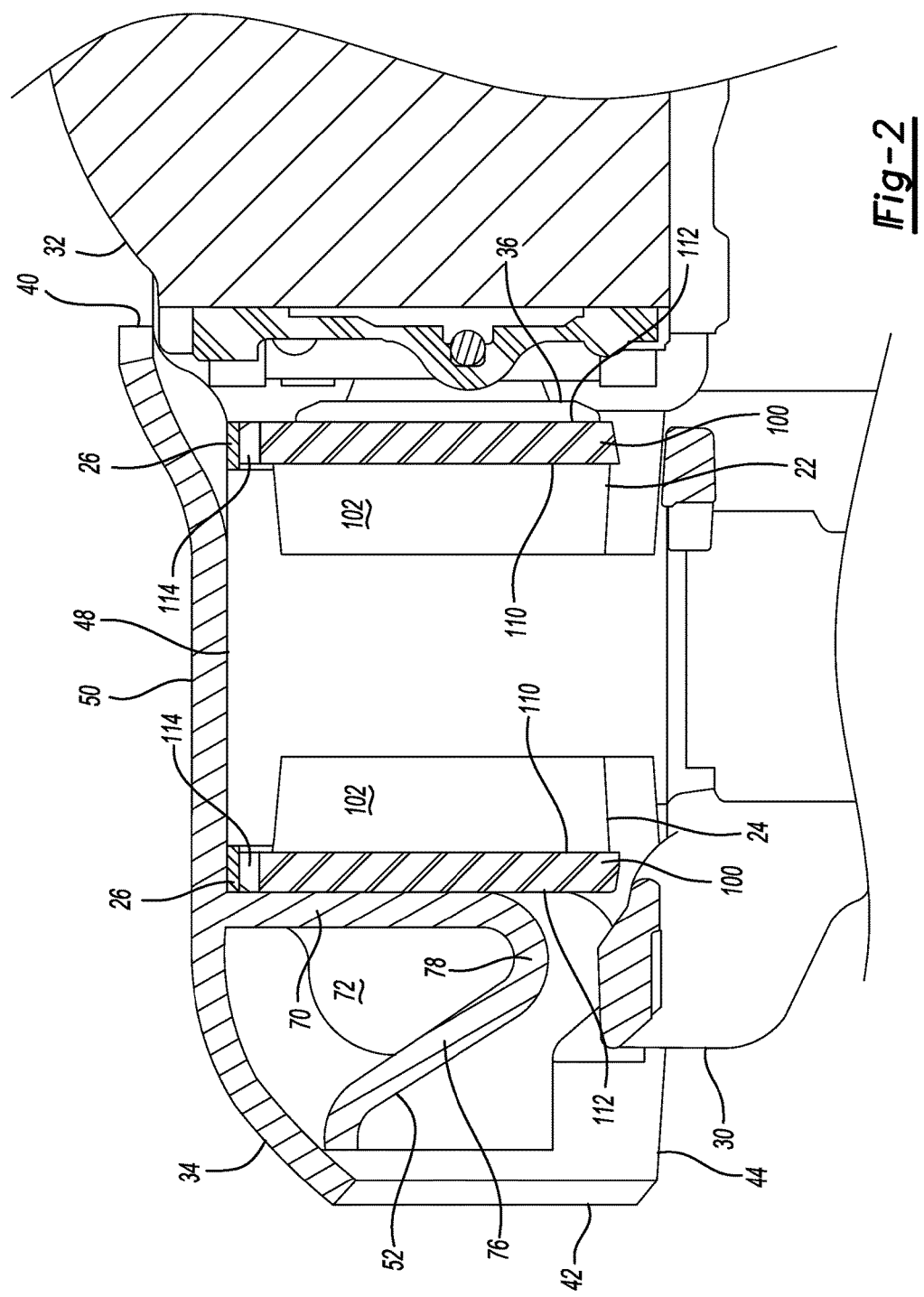
FIG. 2 is a section view of a portion of the brake assembly along section line 2-2.

The housing 32 may be moveably disposed on the brake carrier 30. For example, the housing 32 may be slidably disposed on a pair of guide pins that may be fixedly disposed on the brake carrier 30. As is best shown in FIG. 2, the housing 32 may be associated with or may receive at least one actuator 36 that may actuate the first brake pad assembly 22 and the second brake pad assembly 24 into engagement with the rotor 28. More specifically, the actuator 36 may actuate the first brake pad assembly 22 into engagement with the rotor 28 and then move the housing 32 and bridge 34 to actuate the second brake pad assembly 24 toward the rotor 28. The actuator 36 may have any suitable configuration. For instance, the actuator 36 may include a piston assembly that may be pneumatically, hydraulically, mechanically, electrically, or electromechanically actuated in one or more embodiments. The piston assembly may move along an axis toward or away from the rotor 28 such that the piston assembly may exert force against a back side of the first brake pad assembly 22.

Figure 3:
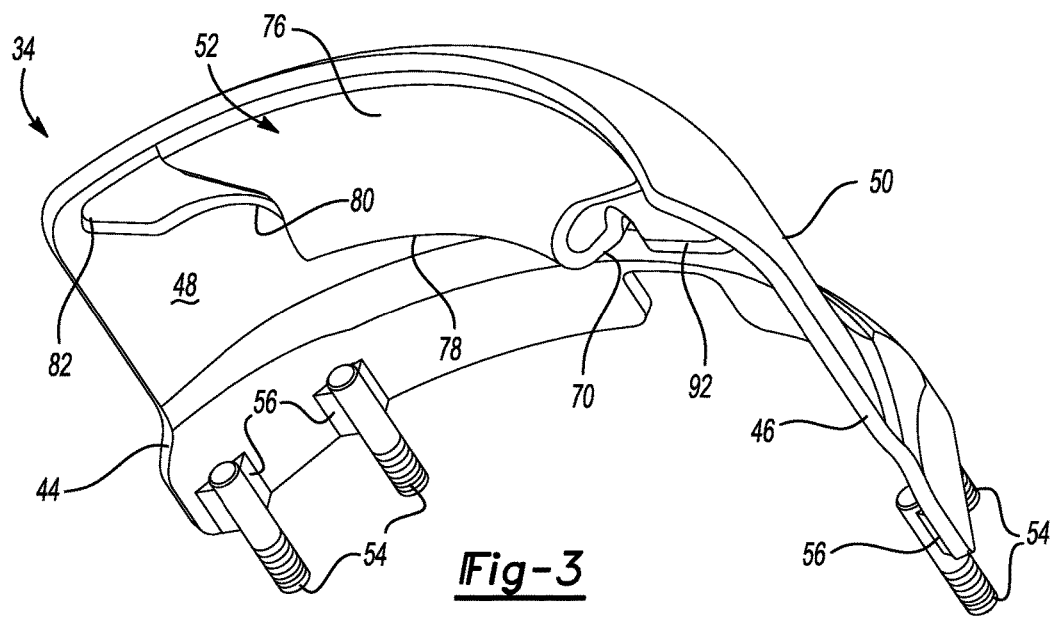
FIGS. 3 and 4 are perspective views of a bridge of the brake assembly.
Figure 4:
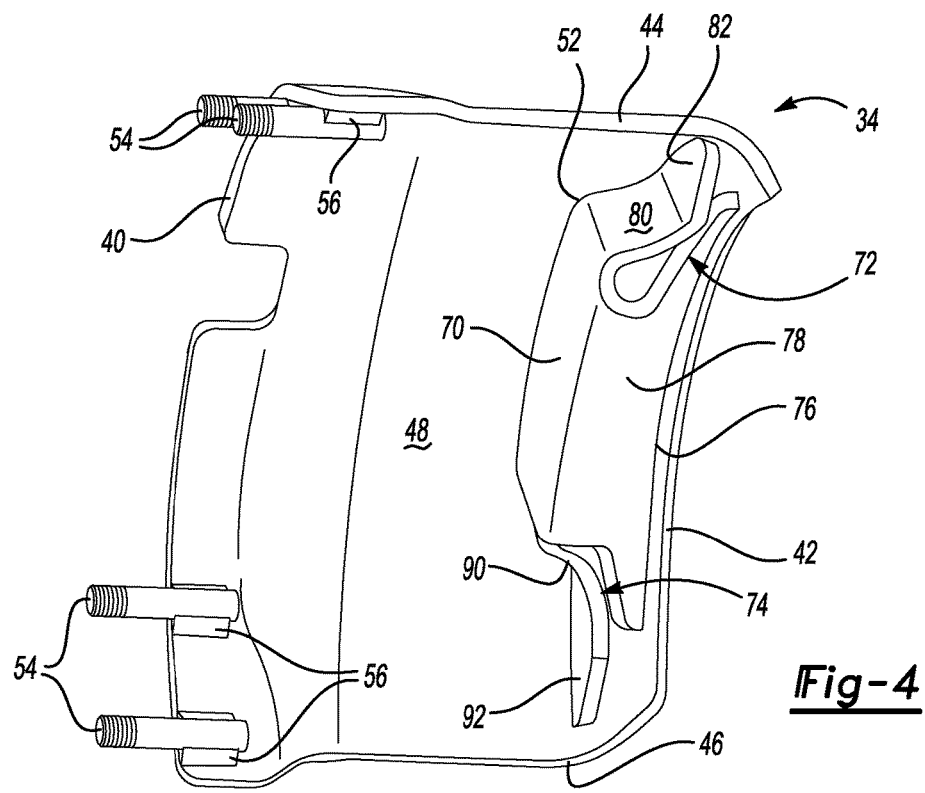

Referring to FIGS. 2-4, the bridge 34 may be fixedly disposed on the housing 32. As such, the bridge 34 may move with the housing 32 with respect to the brake carrier 30 when the brake assembly 10 is actuated. In at least one embodiment, the bridge 34 may include an abutment surface 40, an end surface 42, a first side surface 44, a second side surface 46, an inner surface 48, an outer surface 50, a support bracket 52, a mounting stud 54, and a mounting stud flange 56. The bridge 34 may also include three main regions, namely a housing end region 60, a center region 62, and an outer end region 64.

The abutment surface 40 may be disposed proximate and may engage the housing 32. For example, a portion of the abutment surface 40 that is disposed adjacent to the mounting studs 54 may engage the housing 32 while a portion of the abutment surface 40 that is disposed near the center of the bridge 34 may extend over and may be spaced apart from the housing 32. The abutment surface 40 may be substantially planar or may be disposed in a plane in one or more embodiments.

The end surface 42 may be disposed opposite the abutment surface 40. The end surface 42 may generally face toward the brake carrier 30 and may extend along an arc from the first side surface 44 to the second side surface 46. The end surface 42 may be spaced apart from the first brake pad assembly 22 and the second brake pad assembly 24 such that the first brake pad assembly 22 and the second brake pad assembly 24 may be disposed between the housing 32 and the end surface 42.

The first side surface 44 may extend from the abutment surface 40 to the end surface 42. The first side surface 44 may face toward the brake carrier 30 and may define a portion of the perimeter of the bridge 34.

The second side surface 46 may be disposed opposite the first side surface 44. The second side surface 46 may extend from the abutment surface 40 to the end surface 42. As such, the first side surface 44 and the second side surface 46 may extend from opposite ends of the abutment surface 40 and from opposite ends of the end surface 42. The second side surface 46 may face toward the brake carrier 30 and may define a portion of the perimeter of the bridge 34. In addition, the second side surface 46 may have substantially the same configuration as the first side surface 44.

The inner surface 48 may face toward the brake carrier 30, the first brake pad assembly 22, and the second brake pad assembly 24. Moreover, the inner surface 48 may extend over the first brake pad assembly 22, the second brake pad assembly 24, and the rotor 28. The inner surface 48 may extend from the abutment surface 40 to the end surface 42 and may extend from the first side surface 44 to the second side surface 46. In at least one embodiment, the inner surface 48 may extend continuously along an arc from the first side surface 44 to the second side surface 46.

The outer surface 50 may be disposed opposite the inner surface 48. As such, the outer surface 50 may face away from the brake carrier 30. The outer surface 50 may be disposed substantially parallel to the inner surface 48 in one or more embodiments.

The bridge 34 may be provided without any openings or through holes that may extend through the inner surface 48 in a center region 62 that may extend over the first brake pad assembly 22 and the second brake pad assembly 24. As such, the bridge 34 may not have an opening that may receive a brake pad shield or a retainer bracket, such as may be mounted on the housing 32 and the bridge 34 to help retain the brake pad shield. Alternatively, the bridge 34 may not have any openings or access holes that are large enough to permit installation or removal of the first brake pad assembly 22 or the second brake pad assembly 24 through the bridge 34. Such a bridge 34 may have greater strength and stiffness as compared to a bridge having an access hole above the brake pad assemblies. The bridge 34 may also have a reduced thickness and reduced weight as compared to a bridge having an access hole above the brake pad assemblies (which may be configured as a thicker U-shaped cast part that may extend around the brake pad assemblies to provide the access hole). Optionally, the bridge 34 may be provided with a decreased thickness from the inner surface 48 to the outer surface 50 in a region that is disposed above the brake pad assemblies as compared to the perimeter regions of the bridge 34 to help further reduce weight.

Referring to FIGS. 2-4, the support bracket 52 may extend from the inner surface 48 and may be disposed proximate the second brake pad assembly 24. For instance, the support bracket 52 may engage a backing plate of the second brake pad assembly 24 to help position and actuate the second brake pad assembly 24. The support bracket 52 may have a unitary or one-piece construction and may be fixedly disposed on the inner surface 48. The support bracket 52 may be fixedly disposed on the inner surface 48 in any suitable manner, such as by welding. In at least one embodiment, the support bracket 52 may include an inner wall 70, a first reinforcement flange 72, a second reinforcement flange 74, an outer wall 76, and a connecting wall 78.

The inner wall 70 may face toward the housing 32 and may engage the second brake pad assembly 24 and its associated brake pad spring 26. The inner wall 70 may extend from the inner surface 48 and may be disposed substantially perpendicular to the inner surface 48 and substantially parallel to the rotor 28. As is best shown in FIG. 4, the inner wall 70 may be spaced apart from the abutment surface 40, end surface 42, first side surface 44, and the second side surface 46.

The first reinforcement flange 72 may extend from the inner surface 48 and may extend from a first end of the inner wall 70 toward the first side surface 44. The first reinforcement flange 72 may be offset from the inner wall 70. For example, the first reinforcement flange 72 may extend away from the housing 32 and toward the end surface 42 such that the first reinforcement flange 72 may not engage the second brake pad assembly 24.

As is best shown in FIG. 4, the first reinforcement flange 72 may include a ramp portion 80 and a wing portion 82. The ramp portion 80 may extend at an angle from the inner wall 70. For instance, the ramp portion 80 may extend away from the housing 32 and may extend along an arc. The wing portion 82 may extend from an end of the ramp portion 80. As such, the ramp portion 80 may extend from the inner wall 70 to the wing portion 82. The wing portion 82 may extend at an angle from the ramp portion 80 and may be disposed substantially parallel to the inner wall 70 in one or more embodiments. In addition, the wing portion 82 may extend toward and may be spaced apart from the first side surface 44. The ramp portion 80 and/or the wing portion 82 may extend from and may be attached to the inner surface 48 in one or more embodiments.

The second reinforcement flange 74 may be disposed opposite the first reinforcement flange 72. The second reinforcement flange 74 may extend from the inner surface 48 and may be a mirror image of the first reinforcement flange 72. In addition, the second reinforcement flange 74 may extend from a second end of the inner wall 70 toward the second side surface 46. The second reinforcement flange 74 may be offset from the inner wall 70. For example the second reinforcement flange 74 may extend away from the housing 32 and toward the end surface 42 such that the second reinforcement flange 74 may not engage the second brake pad assembly 24.

As is best shown in FIG. 4, the second reinforcement flange 74 may include a ramp portion 90 and a wing portion 92. The ramp portion 90 may extend at an angle from the inner wall 70. For instance, the ramp portion 90 may extend away from the housing 32 and may extend along an arc. The wing portion 92 may extend from an end of the ramp portion 90. As such, the ramp portion 90 may extend from the inner wall 70 to the wing portion 92. The wing portion 92 may extend at an angle from the ramp portion 90 and may be disposed substantially parallel to the inner wall 70 in one or more embodiments. In addition, the wing portion 92 may extend toward and may be spaced apart from the second side surface 46. The ramp portion 90 and/or the wing portion 92 may extend from and may be attached to the inner surface 48 in one or more embodiments.

Referring to FIG. 2, the outer wall 76 may be spaced apart from the inner wall 70. The outer wall 76 may extend from and may be attached to the inner surface 48 and may be disposed between the inner wall 70 and the end surface 42. In addition, the outer wall 76 may not be disposed parallel to the inner wall 70. The outer wall 76 may have a first end and a second end. The first end may extend from the connecting wall 78. The second end may be disposed opposite the first end and may be disposed proximate the inner surface 48. For instance, the second end may be disposed adjacent to the end surface 42 of the bridge 34.

The connecting wall 78 may extend between and may connect the inner wall 70 to the outer wall 76. The connecting wall 78 may extend from an end of the inner wall 70 that may be disposed opposite the inner surface 48 to an end of the outer wall 76. In at least one embodiment, the connecting wall 78 may extend along a continuous curve or arc. In addition, the connecting wall 78 may be disposed further from the inner surface 48 than the inner wall 70 and the outer wall 76.

Referring to FIGS. 1 and 2, the housing end region 60 may extend from the abutment surface 40 to the center region 62. The housing end region 60 may generally extend along an arc and may extend over and may engage an upper surface the housing 32. The housing end region 60 may define a notch 66 that may extend from the abutment surface 40 towards the center region 62. The notch 66 may receive a portion of the housing 32 and may not extend to the center region 62.

The center region 62 may be disposed between the housing end region 60 and the outer end region 64. As such, the center region 62 may be disposed between and may be spaced apart from the abutment surface 40 and the end surface 42. The center region 62 may extend continuously from the first side surface 44 to the second side surface 46 and over the first brake pad assembly 22 and the second brake pad assembly 24. In addition, the center region 62 may have no openings or holes that are large enough to allow a brake pad assembly to be installed on or removed from the brake assembly 10. Optionally, the center region 62 may be provided with a small opening or hole may facilitate visual inspection of the brake pad assemblies and may be fitted with a transparent or semitransparent window to close such an opening or hole. The inner wall 70 of the support bracket 52 may be disposed on the center region 62.

The outer end region 64 may extend from the center region 62 to the end surface 42. The outer end region 64 may extend along an arc from the first side surface 44 to the second side surface 46 and may also extend along an arc from the center region 62 to the end surface 42. The first reinforcement flange 72, second reinforcement flange 74, and outer wall 76 of the support bracket 52 may be disposed on the outer end region 64.

Referring to FIGS. 3 and 4, one or more mounting studs 54 may be provided to facilitate coupling of the bridge 34 to the housing 32. In FIGS. 3 and 4, four mounting studs 54 are shown; however, it is contemplated that a greater or lesser number of mounting studs may be provided in one or more embodiments. The mounting studs 54 may extend substantially parallel to each other. Each mounting stud 54 may be received in or may extend through a corresponding hole in the housing 32. For instance, a mounting stud 54 may extend through a hole in the housing 32 and may be secured to the housing 32 with a nut. As such, the mounting stud 54 may enable the bridge 34 to be easily removed from the housing 32 by removing the nuts, thereby facilitating maintenance of the brake assembly 10, such as inspection or replacement of the first brake pad assembly 22 and the second brake pad assembly 24.

A mounting stud flange 56 may facilitate mounting of a mounting stud 54 to the bridge 34. The mounting stud flange 56 may be disposed on the inner surface 48. The mounting stud 54 may be fixedly disposed on a corresponding mounting stud flange 56 such that each mounting stud 54 may be spaced apart from and may not engage the inner surface 48.

The first brake pad assembly 22 and the second brake pad assembly 24 may be configured to engage opposite sides of the rotor 28 to slow the rotation of a vehicle wheel. The first brake pad assembly 22 and the second brake pad assembly 24 may have similar or identical configurations. In at least one embodiment, the first brake pad assembly 22 and the second brake pad assembly 24 may each have a backing plate 100 and a friction material 102.

Referring to FIGS. 2 and 3, the backing plate 100 may be a structural member of a brake pad assembly 22, 24. The backing plate 100 may be made of any suitable material, such as a metal or metal alloy. In at least one embodiment, the backing plate 100 may include a first surface 110, a second surface 112, and one or more tabs 114. The first surface 110 may face toward the friction material 102. The second surface 112 may be disposed opposite the first surface 110. One or more tabs 114 may extend from a top of the backing plate 100 toward the inner surface 48 of the bridge 34. The tabs 114 may facilitate positioning of a corresponding brake pad spring 26. For instance, the tabs 114 may extend through one or more openings in a corresponding brake pad spring 26.

The friction material 102 may be disposed on the backing plate 100. More specifically, the friction material 102 may be fixedly disposed on the first surface 110 of the backing plate 100. The friction material 102 may face toward the rotor 28 and may engage the rotor 28 during vehicle braking.

A brake pad spring 26 may be provided with the first brake pad assembly 22 and the second brake pad assembly 24. For example, a first brake pad spring 26 may be disposed between the first brake pad assembly 22 and the inner surface 48 of the bridge 34. As such, the first brake pad spring 26 may extend from the first brake pad assembly 22 to the inner surface 48 and may engage the first brake pad assembly 22 and/or the inner surface 48. A second brake pad spring 26 may be spaced apart from the first brake pad spring 26 and may be disposed between the second brake pad assembly 24 and the inner surface 48. As such, the second brake pad spring 26 may extend from the second brake pad assembly 24 to the inner surface 48 and may engage the second brake pad assembly 24 and/or the inner surface 48. A brake pad spring 26 may exert a biasing force on a corresponding brake pad assembly that may the brake pad assembly against the brake carrier 30 to help position the brake pad assembly.

The bridge 34 may be made of a metal alloy and may be primarily manufactured as a stamping rather than a cast part. For example, a sheet of material having a nominal thickness may be provided. A blank may be stamped out of the sheet of material that has the desired shape of the bridge 34. As such, a blank may either be stamped out of the sheet of material to provide the outline or perimeter of the bridge 34 and then the blank may be formed or pressed over a die to provide the desired curvature or the stamping and forming operations may be conducted substantially simultaneously on a common die and press. The support bracket 52 may be stamped and formed separately from the blank for the bridge 34. Next, components of the bridge such as the support bracket 52 and the mounting studs 54 may be attached to the stamped and formed bridge blank to complete the bridge 34. The mounting studs 54 may be attached to the mounting stud flanges 56 before or after the mounting stud flanges 56 are attached to the inner surface 48 of the bridge 34. The mounting studs 54 and mounting stud flanges 56 may be attached to the inner surface 48 before, after, or at the same time the support bracket 52 is attached to the inner surface 48.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a brake carrier that supports first and second brake pad assemblies;
    first and second brake pad springs disposed on the first and second brake pad assemblies, respectively;
    a housing disposed on the brake carrier, wherein the housing receives an actuator for actuating the first and second brake pad assemblies; and
    a bridge that is fixedly disposed on the housing, the bridge including:
        a first side surface that faces toward the brake carrier;
        a second side surface that faces toward the brake carrier and is disposed opposite the first side surface;
        an inner surface that extends from the first side surface to the second side surface and extends over the first and second brake pad assemblies, wherein the first and second brake pad springs engage the inner surface; and
        a support bracket that extends from the inner surface, wherein the support bracket has an inner wall that extends from the inner surface and engages the second brake pad assembly, an outer wall that extends from the inner surface and is spaced apart from the inner wall, and a connecting wall that extends from an end of the inner wall that is disposed opposite the inner surface to an end of the outer wall.

2. The brake assembly of claim 1 wherein the inner surface extends continuously along an arc from the first side surface to the second side surface such that no openings are provided in the bridge between the first side surface and the second side surface in a center region that extends over the first and second brake pad assemblies.

3. The brake assembly of claim 1 wherein the bridge further comprises an abutment surface disposed proximate the housing and an end surface disposed opposite the abutment surface, wherein the inner surface extends from the abutment surface to the end surface.

4. The brake assembly of claim 3 wherein the first side surface and the second side surface extend from the abutment surface to the end surface.

5. The brake assembly of claim 1 wherein the bridge further comprises a mounting stud that extends from the bridge and couples the bridge to the housing.

6. The brake assembly of claim 5 further comprising a mounting stud flange that is disposed on the inner surface, wherein the mounting stud is disposed on the mounting stud flange and extends through a hole in the housing.

7. The brake assembly of claim 6 wherein the mounting stud is spaced apart from and does not engage the inner surface.

8. A brake assembly comprising:
    a housing that receives an actuator that actuates a brake pad assembly;
    a bridge that is fixedly disposed on the housing, the bridge including:
        an abutment surface disposed on the housing;
        an end surface disposed opposite the abutment surface;
        a first side surface that extends from the abutment surface to the end surface;
        a second side surface that extends from the abutment surface to the end surface and is disposed opposite the first side surface;
        an inner surface that extends from the abutment surface to the end surface and from the first side surface to the second side surface; and
        a support bracket that extends from the inner surface, wherein the support bracket has an inner wall that extends from the inner surface and engages the brake pad assembly, an outer wall that is spaced apart from the inner wall and extends from the inner surface, and a connecting wall that extends from an end of the inner wall that is disposed opposite the inner surface to an end of the outer wall.

9. The brake assembly of claim 8 wherein the inner wall faces toward the housing and the support bracket extends from the inner surface and is spaced apart from the first side surface and the second side surface.

10. The brake assembly of claim 9 wherein the support bracket has a first reinforcement flange that extends from a first end of the inner wall toward the first side surface, wherein the first reinforcement flange extends toward the end surface such that the first reinforcement flange does not engage the brake pad assembly.

11. The brake assembly of claim 10 wherein the first reinforcement flange extends from the inner surface.

12. The brake assembly of claim 10 wherein the support bracket has a second reinforcement flange that extends from a second end of the inner wall that is disposed opposite the first end toward the second side surface, wherein the second reinforcement flange extends toward the end surface such that the second reinforcement flange does not engage the brake pad assembly.

13. The brake assembly of claim 12 wherein the second reinforcement flange extends from the inner surface.

14. The brake assembly of claim 8 wherein the bridge further comprises a mounting stud that extends from the bridge and couples the bridge to the housing.

15. The brake assembly of claim 8 wherein the connecting wall extends along an arc.

16. The brake assembly of claim 8 further comprising a brake pad spring that is disposed on the brake pad assembly and engages the inner surface.

17. The brake assembly of claim 8 wherein the outer wall is disposed between the inner wall and the end surface.

18. The brake assembly of claim 8 wherein the connecting wall is disposed further from the inner surface than the inner wall and the outer wall.

19. The brake assembly of claim 10 wherein the first reinforcement flange is disposed further from the housing than the connecting wall.

20. The brake assembly of claim 8 wherein the outer wall is disposed adjacent to the end surface of the bridge.

\* \* \* \* \*